UNITED STATES PATENT OFFICE.

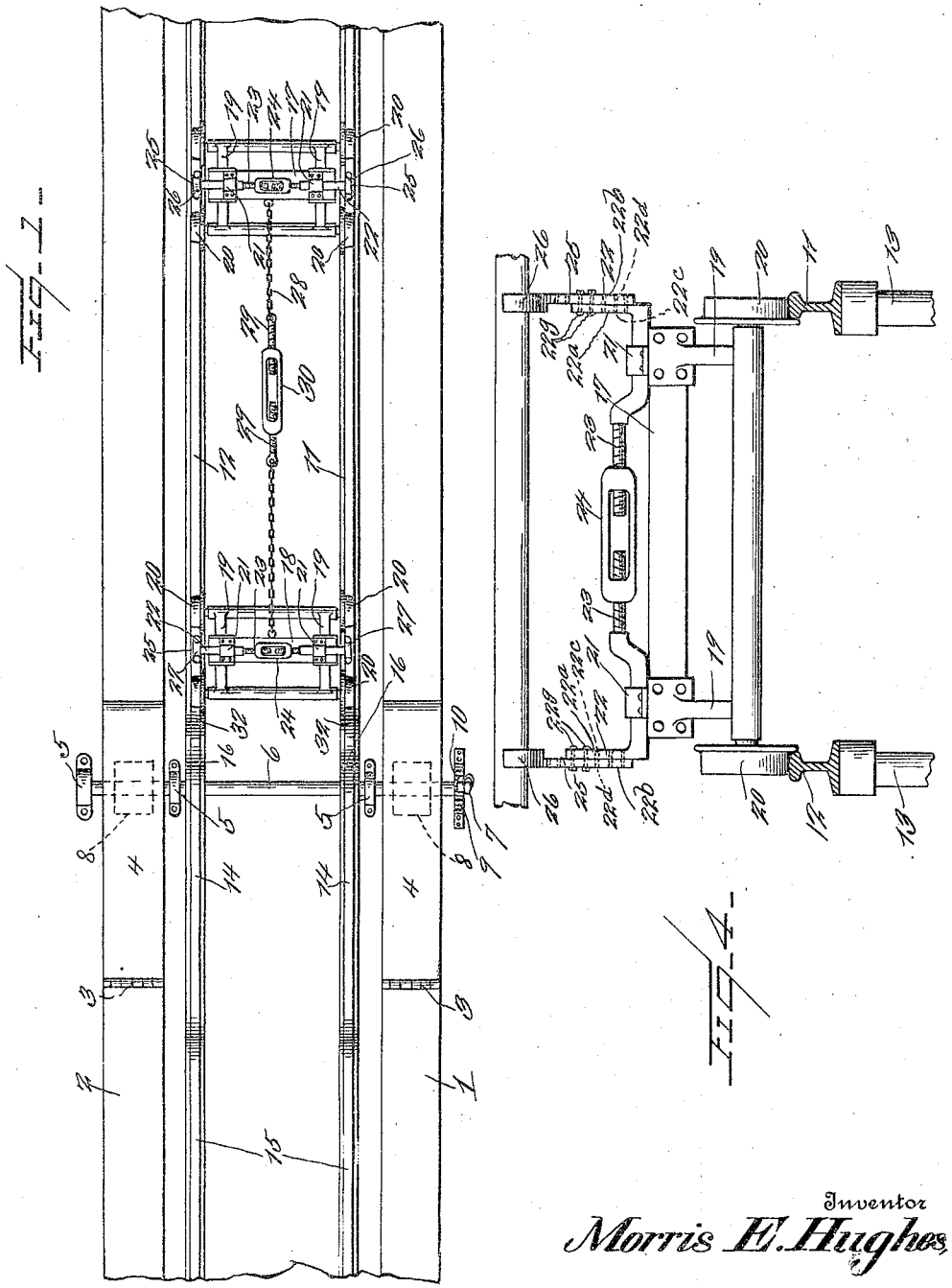

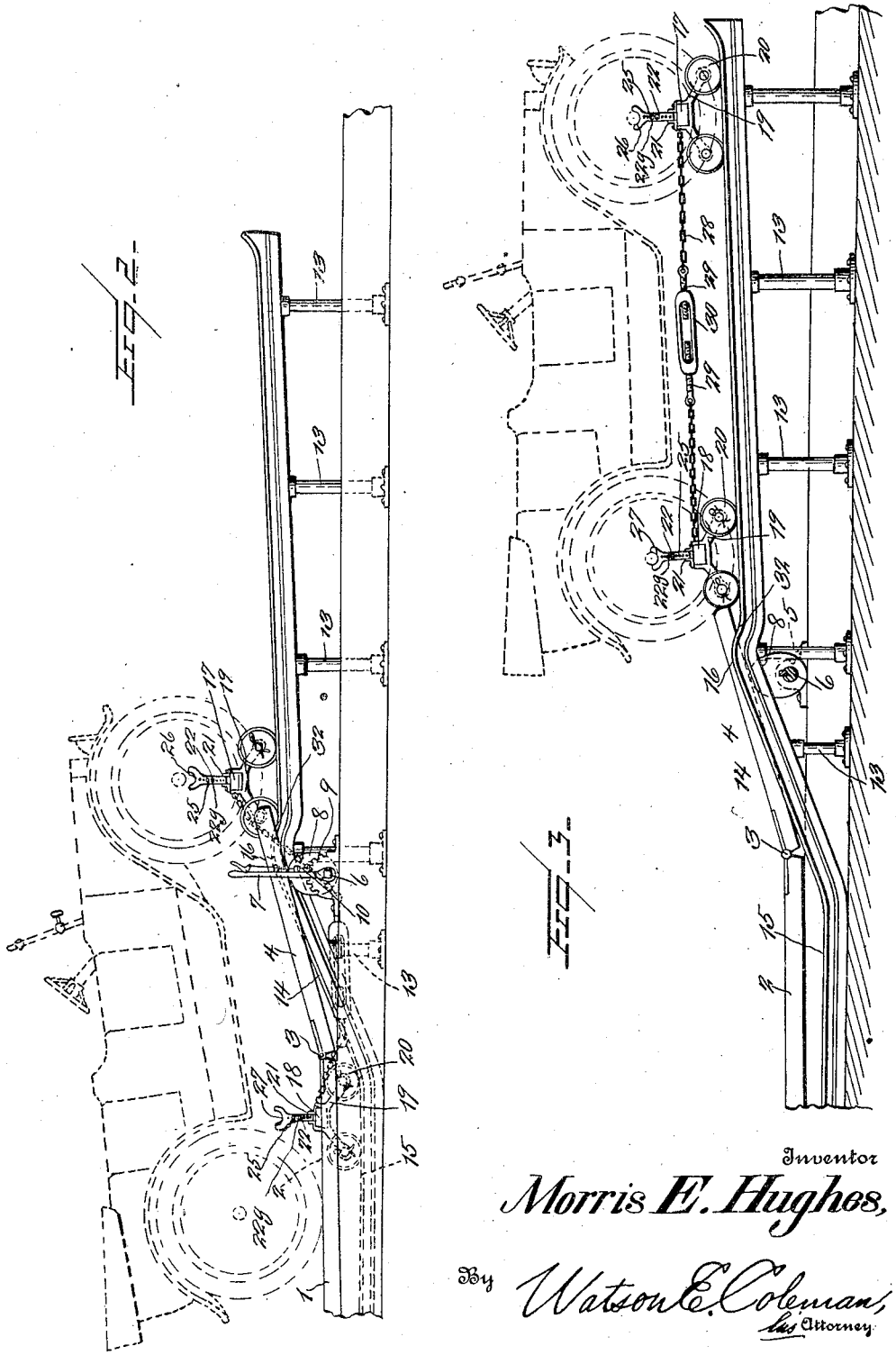

MORRIS E. HUGHES, OF CLARE, IOWA.

VEHICLE LIFTER OR JACK.

1,335,969.   Specification of Letters Patent.   Patented Apr. 6, 1920.

Application filed September 18, 1919. Serial No. 324,328.

*To all whom it may concern:*

Be it known that I, MORRIS E. HUGHES, a citizen of the United States, residing at Clare, in the county of Webster and State of Iowa, have invented certain new and useful Improvements in Vehicle Lifters or Jacks, of which the following is a specification, reference being had to the accompanying drawings.

This invention relates to an improved vehicle lifter or jack, particularly of the inclined plane type, and an object of the invention is to provide a device of this kind for holding and supporting vehicles particularly such as automobiles and the like in raised positions, whereby the tires may be held out of engagement with the floor of the garage or other place, thereby saving the tires.

Another object of the invention is the provision of a vehicle lifter including members on which the wheels of the automobile or other vehicle engage, in combination with means for raising the forward end of the automobile, whereby the front axle thereof may engage the carriage operable on inclined tracks, it being also the aim that when the rear wheels of the automobile engage the inclined means, the rear axle engages bearings of a second carriage, which is designed to operate on said inclined tracks, and when the two carriages are in position on said tracks, the automobile is supported in a raised position, hence holding the forward and rear wheels in elevated positions out of engagement with the floor of the garage.

Another object of the invention is the provision of carriages mounted upon inclined tracks, in combination with means for adjusting the supporting bearings of the carriages laterally, so as to enable the bearings to engage various constructions of forward and rear axles of automobiles.

A still further object of the invention is the provision of a connector between the two carriages, in order to hold them in relative positions to engage the forward and rear axles, in combination with means for adjusting the connector.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a plan view of the improved automobile or vehicle lifter constructed in accordance with the invention.

Fig. 2 is a view in side elevation of the lifter, showing an automobile in dotted lines with its forward axle in engagement with one of the carriages.

Fig. 3 is a longitudinal sectional view showing an automobile in dotted lines, with forward and rear axles in engagement with the bearings of both carriages.

Fig. 4 is a transverse sectional view through one of the carriages showing the means whereby the supporting bearings may be adjusted laterally toward and from each other.

Referring more especially to the drawings, 1 and 2 designate inclined members, with which the wheels of the automobile engage, and hingedly connected thereto as at 3 are tilting members 4. Mounted in suitable bearings 5 is a shaft 6 having a handle 7 at one end. Carried by the shaft 6 are cams 8, which are disposed under the tilting members 4. It will be seen that by rocking the shaft 6, the cams may be actuated, to raise the tilting members 4, the purpose of which will hereinafter appear. Rising upwardly from the base on which the lifter is mounted is a segment rack 9, with which a hand grip operated dog 10 (which is carried by the lever 7) engages, thereby holding the lever 7 in different adjusted positions, and also holding the shaft in an adjusted position, to hold the cams in their proper place for holding the tilting members raised.

Arranged between the members 1 and 2 and adjacent their inner faces are tracks 11 and 12. Suitable supports 13 hold the tracks in elevated positions. The rear ends of the tracks have inclined parts 14, beyond which extensions 15 are formed. Forwardly of the inclined parts 14, the greater portions of the tracks are inclined upwardly and slightly in a forward direction. However, immediately adjacent where the greater portions of the tracks merge from the inclined part 14, said tracks are slightly lowered, thereby affording slightly curved shoulders 16.

Adapted to engage the tracks are carriages 17 and 18, the side portions of which have arms 19. Mounted upon the arms are supporting wheels 20, which are flanged on their inner parts to engage the tracks 12. Mounted in bearings 21 of the frames of the carriages are angular brackets 22, and the parts of these brackets which engage the bearings are rectangular in cross-section, so that the brackets are firm and rigid relatively to the carriages. However, the adjacent end portions of those parts of the brackets which are mounted in the bearings of the carriages, are cylindrical and are provided with right and left threads 23 to be engaged by the turn buckles 24. The upstanding parts 25 of the brackets are provided with bearing forks 26 and 27, the forks 26 being carried by the brackets of the forward carriage, while the forks 27 are carried by the brackets of the rear carriage. These forks 26 and 27 are designed to be engaged by the forward and rear axles of an automobile or other vehicle, so as to hold the automobile or vehicle in a raised position. It is obvious that by adjusting the turn buckles 24, the angle brackets may be moved toward and from each other, so that their bearing forks may accommodate themselves to different constructed forward and rear axles of automobiles. In other words, the brackets are, in this manner, adjusted laterally toward and from each other. A flexible member, such as a chain or cable, as indicated at 28 connects between the forward and rear carriages. The remote ends of the flexible members are connected in eyes of the forward and rear carriages as shown. The flexible member is formed in two sections, and the adjacent ends of the two sections engage the eyes of threaded members 29, there being a turn buckle 30 engaging the threaded member 29, for adjusting the two sections of the flexible member, cable or chain, axially toward and from each other.

When it is desired to elevate an automobile or other vehicle, the tiltable members 4 are tilted in inclined positions by the manipulation of the lever 7. The carriages are positioned on the tracks 15 adjacent the drop portions 16 of the tracks. The automobile is then operated, so that its forward wheels will ride up the members 4, and when the wheels ride over the upper ends of the members 4, the forward axle of the automobile is dropped into engagement with the bearing forks 26 of the brackets of the forward carriage. The automobile is further moved, its rear wheels riding up the member 4, and then they pass over the forward ends of said members 4, the rear axle will drop into the bearing forks 27 of the brackets of the rear carriage. The rear wheels will then abut against the forward ends of the members 4 and prevent retrograde movement of the automobile. In this way, the automobile is held in a raised position with its tires out of engagement with the floor of the garage, thereby saving the tires.

When it is desired to lower the automobile so that its wheels may engage the floor of the garage, the elements 4 are lowered, removing their forward ends from engagement with the rear wheels of the automobile. The weight of the automobile will then cause it to move rearwardly owing to the incline of the tracks 11 and 12. The force of gravity will be sufficient to carry the rear wheels over the rearwardly inclined parts 32 of the drop portions of the tracks, so that the rear wheels will roll down the relatively steeper inclines 14. Obviously, the front wheels of the automobile will fall.

The upright portions of the brackets 22 are formed in two parts 22$^a$ and 22$^b$. While this construction is indicated in Figs. 2 and 3, it is more clearly shown in Fig. 4. The parts 22$^a$ and 22$^b$ have registering apertures 22$^c$ and 22$^d$. These apertures receive the bolts 22$^g$, whereby the parts 22$^b$ of the upright portions of the brackets may be held in different adjusted positions vertically, so as to accommodate axles disposed at different heights from the surface of the ground. The adjustment of the parts 22$^b$ of the upright portions of the brackets, also permits the forks 27 of the brackets of the rear carriage 18 to be lowered, so as to permit the forks to pass under the rear axle of the automobile, as the rear wheels of the automobile are passing up the inclined members 4, so that the rear carriage may be positioned on the rails forward of the inclined parts 32, after which the forks are again raised, so as to receive the rear axle of the automobile, as the wheels of the automobile pass off the inclined members 4.

The invention having been set forth, what is claimed as new and useful is:

1. In a lifter of the kind set forth, the combination with supported spaced tracks having their forward greater portions slightly inclined, and having relatively steeper inclined portions immediately to the rear of said greater portion, the upper portions of which merge into curved bulges, the forward portions of which acting as abutments, of forward and rear carriages mounted upon the tracks, one positioned immediately adjacent said abutments of the curved bulges, the other disposed immediately at the lower ends of the relatively steeper portions, and means adapted to be disposed in inclined positions to be engaged by forward and rear wheels of an automobile, whereby the automobile may be raised, so that its forward axle may become positioned above and then in engagement with the bearings of the first mentioned carriage, while said carriage is in engagement with said abutments of the tracks.

2. In a vehicle lifter, the combination with supporting tracks having their forward portions slightly inclined and having relatively steeper inclined parts immediately to the rear of said forward portions, said relatively steeper inclined parts merging into curved bulges, which in turn merge into the rear ends of the slightly inclined portions, of forward and rear carriages on the tracks, one adjacent to but forward of the bulges, and having bearings to receive the forward axle of the automobile, the other carriage adapted to be positioned at the bottom of the relatively steeper inclined parts and having bearings to receive the rear axle about the time the last mentioned carriage and the rear wheel of the automobile reach a position on the slightly inclined portions of the tracks beyond the bulges, and tiltable elements adapted to be inclined relatively to the steeper inclined parts of the tracks, and on which the forward and rear wheels of the automobile are adapted to ride, whereby the forward and rear axles of the automobile may drop into engagement with the bearings of the carriages.

3. In a vehicle lifter, the combination with elevated supporting tracks, having upwardly inclined parts merging into said elevated supporting tracks, of carriages mounted on said tracks, one adapted to be positioned immediately beyond where the inclined parts merge into the elevater supporting tracks, the other adapted to be positioned at the base of the inclined parts, said carriages having bearings to receive the forward and rear axles respectively of the vehicle, and means for elevating the vehicle, whereby the forward and rear axles of the automobile may engage the bearings of the carriages for supporting the automobile on the elevated supporting tracks, and a device for actuating said means to position it to elevate the vehicle, whereby the forward axle may engage the bearings of the first carriage, and the rear axle may engage the bearings of the second carriage.

4. In a vehicle lifter, the combination with spaced tracks, having the forward portions upon an elevated plane and the rear portions on a relatively lower plane, said track having inclined parts connecting the forward and rear portions of the tracks, a pair of carriages having bearings, one carriage adapted to be positioned at the head of the inclined portions of the tracks, the other carriage adapted to be positioned at the base of the inclined portions, and tiltable members for elevating the automobile to position the forward and rear axles in engagement with the bearings of the carriages.

5. In a vehicle lifter, the combination with spaced tracks, having the forward portions upon an elevated plane and the rear portions on a relatively lower plane, said track having inclined parts connecting the forward and rear portions of the tracks, a pair of carriages having bearings, one carriage adapted to be positioned at the head of the inclined portions of the tracks, the other carriage adapted to be positioned at the base of the inclined portions, tiltable members for elevating the automobile to position the forward and rear axles in engagement with the bearings of the carriages, said tiltable members adapted to engage behind the rear wheels of the automobile when the same is elevated to a position over the elevated portions of the tracks, and means for tilting said members to elevate the automobile or to release it.

6. In a vehicle lifter, the combination with spaced tracks, having the forward portions upon an elevated plane and the rear portions on a relatively lower plane, said track having inclined parts connecting the forward and rear portions of the tracks, a pair of carriages having bearings, one carriage adapted to be positioned at the head of the inclined portions of the tracks, the other carriage adapted to be positioned at the base of the inclined portions, tiltable members for elevating the automobile to position the forward and rear axles in engagement with the bearings of the carriages, said tiltable members adapted to engage behind the rear wheels of the automobile when the same is elevated to a position over the elevated portions of the tracks, and means for tilting said members to elevate the automobile or to release it, and a connection between the two carriages, whereby the last mentioned carriage may move up the inclined portions of the tracks, as the rear wheels of the automobile ride upwardly on the tiltable members.

7. In a vehicle lifter, the combination with tracks having forward elevated parts and rear lower parts, inclined portions connecting the forward and rear parts, of carriages mounted upon said tracks, one adapted to be positioned where the inclined portions merge into the forward elevated parts, the other adapted to be positioned at the base of the inclined portions, laterally adjustable brackets mounted on the carriages and having bearings for the reception of the forward and rear axles of the automobile, tiltable elements adapted to elevate the automobile whereby its forward axle may engage the bearings of the first carriage, and the rear axle may engage the bearings of the second carriage after it reaches the elevated parts of the tracks, and a connection between the carriages, whereby the second carriage may be positioned on the elevated parts of the track, so that the bearings may receive the rear axle of the automobile.

8. In a vehicle lifter, the combination with tracks having forward elevated parts and rear lower parts, inclined portions connecting the forward and rear parts, of carriages mounted upon said tracks, one adapted to be positioned where the inclined portions merge into the forward elevated parts, the other adapted to be positioned at the base of the inclined portions, laterally adjustable brackets mounted on the carriages and having bearings for the reception of the forward and rear axles of the automobile, tiltable elements adapted to elevate the automobile whereby its forward axle may engage the bearings of the first carriage, and the rear axle may engage the bearings of the second carriage after it reaches the elevated parts of the tracks, and a connection between the carriages, whereby the second carriage may be positioned on the elevated parts of the track, so that the bearings may receive the rear axle of the automobile, said elements adapted to engage behind the rear wheels of the automobile to prevent retrograde movement of the carriages after the second carriage has been positioned on the elevated parts of the tracks, and means for tilting said elements, to elevate the automobile or release it.

In testimony whereof I hereunto affix my signature.

MORRIS E. HUGHES.